United States Patent [19]

James

[11] 4,382,564
[45] May 10, 1983

[54] ACCELERATION SENSOR

[76] Inventor: Malcolm B. James, Sherriffs Rd., Lonsdale, State of South Australia, Australia

[21] Appl. No.: 234,182

[22] Filed: Feb. 13, 1981

[30] Foreign Application Priority Data

Feb. 19, 1980 [AU] Australia .............................. PE2437

[51] Int. Cl.³ ...................... A62B 35/02; B65H 75/48
[52] U.S. Cl. ............................................. 242/107.4 A
[58] Field of Search ............... 242/107.4 A; 280/806; 297/478, 480

[56] References Cited

U.S. PATENT DOCUMENTS 3,552,676 1/1971 Weber ......................... 242/107.4 A
3,901,461 8/1975 Stephenson et al. ......... 242/107.4 A
3,938,755 2/1976 Stephenson et al. ......... 242/107.4 A
3,967,510 7/1976 Lindblad ................. 242/107.4 A X

FOREIGN PATENT DOCUMENTS 2645456 4/1978 Fed. Rep. of Germany ... 242/107.4 A
2649477 5/1978 Fed. Rep. of Germany ... 242/107.4 A Primary Examiner—John M. Jillions
Attorney, Agent, or Firm—Norbert P. Holler; Charles A. Blank

[57] ABSTRACT

An acceleration sensor for a seat belt retractor of the type having an operating member, for example a pawl, engageable with a locking mechanism, for example a toothed wheel, the sensor comprising a pivoted driver situated below the pawl, and having a center of gravity located above its pivot so that it will tend to topple, a lifting surface on the driver positioned radially outwardly from the pivotal axis, and a yoke having its lower end engaging the lifting surface and constrained thereby, its upper end engaging the pawl and constrained thereby, arranged so that tilting of the driver about the pivotal axis lifts a portion of the lifting surface and in turn lifts the yoke, whereby the pawl is lifted to its wheel engaging position.

10 Claims, 7 Drawing Figures

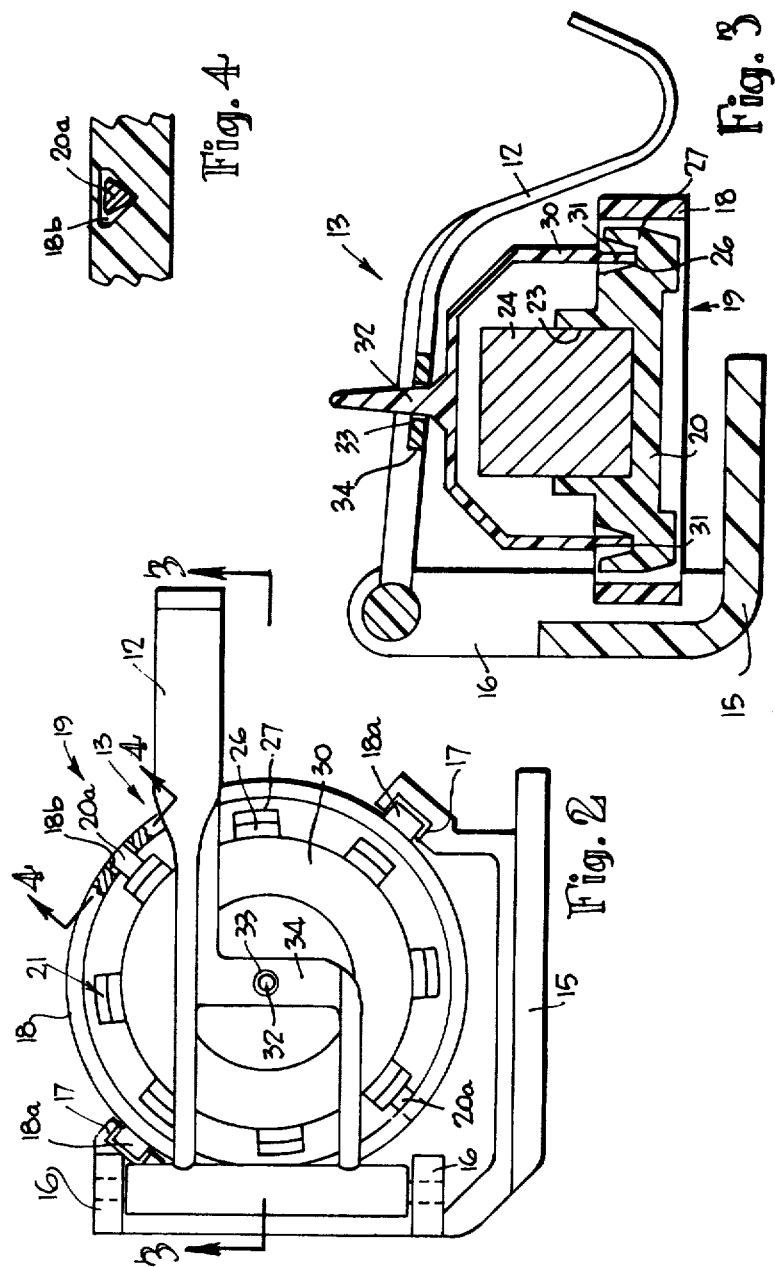

ACCELERATION SENSOR

This invention relates to an acceleration sensor which is useful on a vehicle for sensing change of velocity to in turn actuate a seat belt retractor locking mechanism.

BACKGROUND OF THE INVENTION

Seat belt retractors are in common use on motor vehicles, the usual seat belt retractor sensor comprising means which will give a proportionate increase in pressure upon increase in acceleration or deceleration forces, and this pressure will urge a pawl into engagement with a toothed wheel on the seat belt retractor. Once the toothed wheel has been arrested in this rotation, this in turn functions to operate a secondary pawl which will prevent rotation of the seat belt retractor spool, thereby restraining the belt against feeding out, for example in the case of an accident which is associated with sudden acceleration forces.

However one of the difficulties encountered with this type of arrangement (which is the most commonly used arrangement) is that there can be a relatively slow movement of the pawl, or the development of a force which is not quite enough to urge the pawl into full engagement, and when only partial engagement of the pawl with the tips of the teeth of the toothed wheel occurs, it can result in damage to the pawl or to the toothed wheel. Furthermore, although the possibility is very slight, there is nevertheless the possibility of malfunction of the locking mechanism for the seat belt retractor.

One object of this invention is to provide improvements wherein this difficulty is substantially avoided, and a "snap action" is achieved.

This difficulty has been recognised previously, and in an acceleration sensor which was previously produced by the Applicant herein, a driver was provided with a centre of gravity located above pivot means so that it tended to topple, the driver having a peripheral lifting surface engaged by the periphery of an inverted cup-like yoke. However, in that invention the yoke had an upstanding stem guided for movement by the walls of an aperture in a tab on the seat belt retractor frame, and the employment of rubbing surfaces at that location made it necessary for the driver to have considerable mass, and therefore be of considerable size.

The main object of this invention is to provide improvements whereby there can be provided a variety of installation angles by the change of a small number of parts.

BRIEF SUMMARY OF THE INVENTION

Briefly in this invention, there is provided an operating member (for example, a pawl) which is moved into engagement with a locking mechanism (for example, a toothed wheel) on a seat belt retractor, and the invention incorporates a driver which is situated below the pawl but pivoted with respect to the frame while at the same time being inhibited against rotation, the driver having a centre of gravity located above its pivot means so that it will tend to topple, a lifting surface on said driver positioned radially outwardly from said pivotal axis, and a yoke having its lower end engaging the lifting surface and constrained thereby, and its upper end engaging the pawl and constrained thereby, such that tilting of said driver about said pivotal axis lifts a portion of said lifting surface and in turn lifts said yoke, and thereby lifts said pawl to its said wheel engaging position. That is when sufficient lateral acceleration is applied to the driver, the pawl will be fully and rapidly driven into its engagement position with the teeth of the wheel and this will reduce likelihood of damage to the pawl or teeth.

Since the driver is inhibited against rotation, it can be provided with an inertia-imparting weight which is assymetrical to whatever extent is required to suit the angle at which a seat belt retractor is to be installed. Only the driver then needs to be changed if a different angle of installation is required.

Further, this invention makes possible the use of a very light weight driver and consequently a sensor of physically small construction, and this is a particularly desirable feature since it results in a durable sensor and also enables the reduction of size of a seat belt retractor, in turn associated with reduction of weight and making it feasible to use the retractor in confined spaces. In some embodiments of the invention, the yoke has a stem which extends through an aperture in the pawl (to be constrained thereby), and a shoulder on the stem which ensures that the application of an actuating force on the pawl is at the same point, and with the same force, for any direction of tilt of vehicle, or deceleration force.

Specifically, in this invention an acceleration sensor for the locking mechanism on a seat belt retractor to lift into a locking position, comprises a frame, an operating member carried by the frame and movable with respect to the frame between an engaged position and a disengaged position, a yoke having a lower end lying in a lifting plane, and an upper end which engages, and is constrained in its movement by, said operating member, a driver, pivot means on the frame constraining the driver and providing for tilting movement thereof with respect to said frame, means operatively interconnecting said driver and frame and limiting said movement to tilting movement only and inhibiting rotation of said driver in said plane, a lifting surface on said driver which lies in said lifting plane (unless said driver tilts), and which is engaged by said lower end of said yoke so that tilting of said driver lifts said lifting surface which in turn lifts said yoke, said yoke lifting said operating member and moving said operating member into said engaged position.

Heretofore difficulty has been encountered in that seat belt retractor locking devices have required the use of acceleration sensors which are sensitive to the tilt attitude of the retractor. It is important that the sensor should be responsive to the same acceleration level in all directions when a vehicle is on level terrain, regardless of the attitude in which the retractor is installed. Because any one design of seat belt retractor may be required to be used in any one of a number of attitudes on various vehicles or on the same vehicle, this invention provides means whereby inventory requirements would be greatly reduced in that the only change required to provide for a significant range of alternative installation attitudes is a change of one component of the acceleration sensor. Thus in an embodiment of this invention the pivot means comprise a gimbal, and the inner gimbal member comprises the driver, there being an upstanding weight on the driver which is not necessarily symmetrical with respect to a central axis normal to the plane of its lifting surface. By selecting the required degree of asymmetry (which can be zero), the centre of gravity of the driver can be located suitably above the effective pivot of the gimbal when a vehicle is on level terrain, even though the seat belt retractor is secured in a sloping attitude.

The use of a gimbal thereby has the advantage that a driver of selected asymmetry can be quickly and easily assembled to the sensor. However the gimbal arrangement has two further advantages:

Firstly the pivot means can be "knife-edge" means so that the driver pivotal movement has very low friction of rubbing surfaces.

Secondly, the gimbal inhibits rotation of the driver, about the axis normal to the plane of the driver lifting surface and this of course is necessary if the driver weight is asymmetrical.

In an embodiment of the invention wherein the driver is the inner member of a gimbal, the outer member of the gimbal is pivoted to the frame, the driver comprises walls defining a peripheral annular trough, the bottom of which acts as a lifting surface, a yoke which is an inverted cup-like member having a peripheral lip at its lower end engaging lifting surface and constrained by the trough walls, and an upwardly projecting spigot freely movable in an aperture in said pawl. With this arrangement as a lateral acceleration is applied, a lateral force is applied to the centre of gravity of the driver and causes a moment about the effective gimbal axis in the relevant direction, but this moment is opposed by a moment created by the weight of the yoke and the weight of the pawl being applied to the lifting surface of the driver. When the acceleration is sufficient to produce a moment in excess of the said opposing moment, the driver will be caused to tilt, and thereby the lifting surface at one locality will lift the yoke but tilting of the yoke is limited by its engagement with the pivoted pawl and the annular trough. That is the yoke is free to rise or fall, and with it, the pawl can also rise or fall. Once tilting has commenced and the pawl is lifting, the moment applied by the driver is increased by the weight of the driver because of the shift of its centre of gravity to one side of the pivotal axis. There results a "snap action" which drives the pawl into position very rapidly, even though the acceleration only slightly exceeds the threshold of action.

BRIEF DESCRIPTION OF THE DRAWINGS

An embodiment of the invention is described hereunder in some detail with reference to and is illustrated in the accompanying drawings in which

FIG. 2 is a plan view of the acceleration sensor and pawl assembly,

FIG. 3 is a section taken on line 3—3 of FIG. 2,

FIG. 4 is a fragmentary section taken on line 4—4 of FIG. 2,

Figure 6:
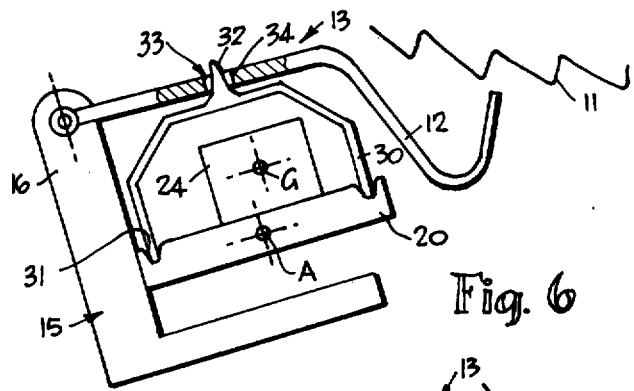
FIG. 6 is a diagrammatic elevation showing the yoke and pawl in one of its two stable conditions, that is with the pawl disengaged from the teeth of a toothed wheel

In this embodiment a seat belt retractor 10 is arranged for securing to a horizontal mounting substrate of a vehicle (not shown), but can be used in other attitudes (for example, as shown in FIG. 6). The seat belt retractor 10 is provided with a primary toothed wheel 11 arranged to be engaged by a pawl 12 of an acceleration sensor 13.

Details of the sensor 13 are shown in FIGS. 2, 3, 4 and 5, the sensor 13 comprising a frame 15 which has a pair of upstanding wings 16, between which the pawl 12 is pivoted.

The frame 15 is also provided with a pair of gimbal pivot support surfaces 17 in which is pivoted the outer member 18 of a gimbal 19. The gimbal outer member 18 is itself provided with a pair of outstanding aligned stub shafts 18a which pivot about a first axis on the supports 17, and also has apertures 18B in which outstanding aligned stub shafts 20a are pivoted about an axis at right angles to the first pivotal axis of the gimbal ring 18. The stub shafts 20a are outstanding from an inner gimbal member 20, which constitutes a driver for imparting a moment which in turn can result in a force lifting the pawl 12.

The stub shafts 18a and 20a are all of triangular cross-sectional shape as shown in FIG. 4, and in each case the lowermost edge forms a "knife-edge" which bears against a support surface for pivoting with minimal friction.

As shown in FIG. 4, walls 18B define a deep slot which contains the stubs 20a of the gimbal inner member 20.

The driver 20 can be substituted with another of different asymmetry, as described below.

Figure 1:
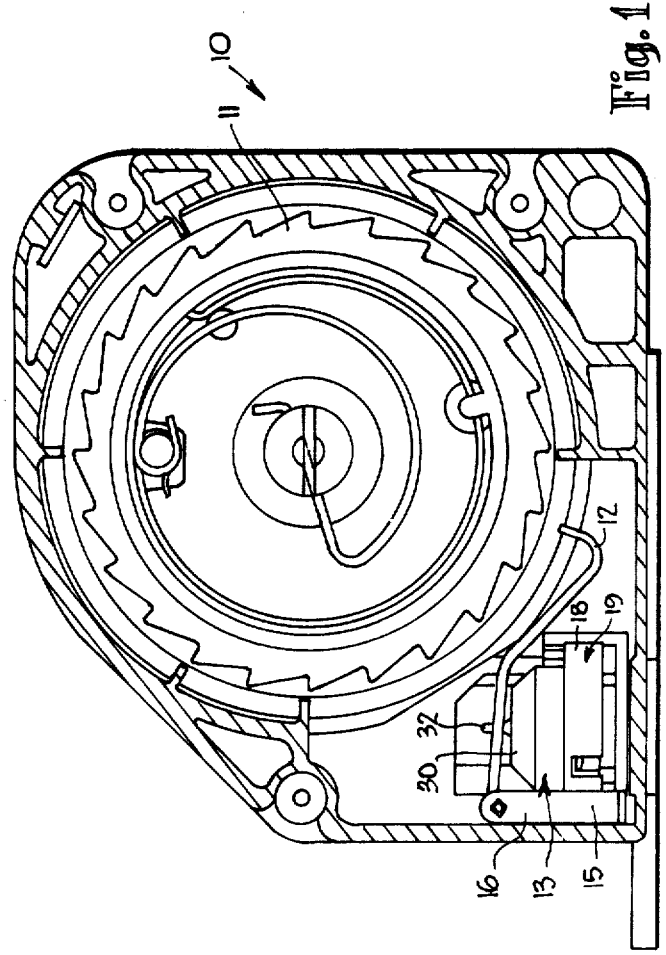
FIG. 1 is a partly sectioned side elevation of a seat belt retractor illustrating a pawl which is pivoted to a frame of an acceleration sensor, and co-operable with the teeth of a toothed wheel.
Figure 5:
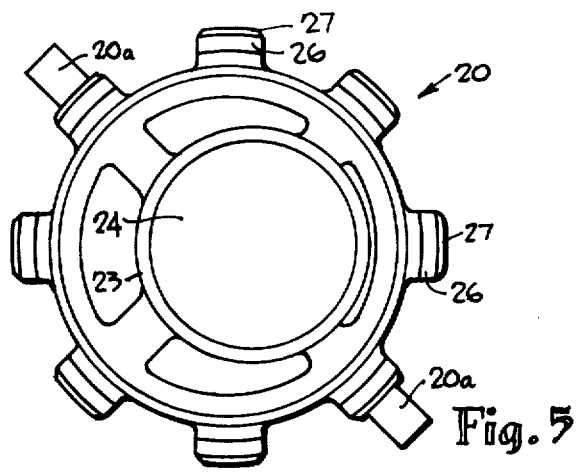
FIG. 5 is a plan view of the driver.
Figure 7:
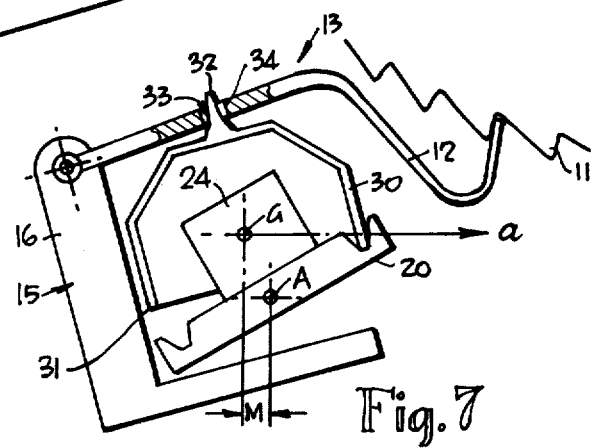
FIG. 7 is a view similar to FIG. 6 but showing the other stable condition, that is with the pawl engaged with a tooth of the toothed wheel.

As seen best in FIGS. 3 and 5, the driver 20 comprises a moulded structure having walls defining a receptacle 23 in which is located a weight 24, the weight 24 being positioned such that the centre of gravity G (FIGS. 6 and 7) is well above the effective pivotal point A of the gimbal. In those instances wherein the seat belt retractor is not to be mounted in a horizontal attitude (for example FIGS. 6 and 7) but is in a sloping attitude (and this accounts for most instances of mounting), the receptacle 23 may be asymmetrical with respect to the centre of the driver 20, as best seen in FIG. 5. If the mounting is in a sloping attitude as shown in FIGS. 6 and 7, then when the pawl 12 is in its disengaged position, the centre of gravity G is positioned approximately vertically above the point A.

The driver 20 is also provided with an interrupted annular trough, being an annular groove 26 which is defined by walls of radially outstanding circumferentially spaced projections 27, below the centre of gravity G and surrounding the effective pivotal point A of the gimbal.

Located above the driver 20, is an inverted cup-shape structure, being an annular yoke 30, the yoke 30 having a depending periphery 31 which engages the wall defining the bottom of the groove 26. Since the groove 26 is interrupted likelihood of malfunction due to accumulation of dust or other debris is unlikely to occur. To achieve "knife-edge" operation, that part of the periphery 31 which engages the groove bottom is an edge defined between two surfaces at an angle to one another.

The yoke 30 is provided with an upstanding shoulder spigot 32 and this extends through an aperture 33 in the bridge portion 34 of the pawl 12, the shoulder of spigot 32 having a part-conical wall which engages the edge defined between the walls of aperture 33, and the under surface of bridge portion 34, again in a "knife-edge" manner.

FIGS. 6 and 7 illustrate graphically the way in which the yoke and pawl are bistable in respect of the wheel engaged position and disengaged position of the pawl. FIG. 6 illustrates the normal operating position of the yoke resting with its periphery 31 in the groove 26.

FIG. 7 illustrates the position which is taken by the driver 20 upon sufficient acceleration "a" being imparted to the sensor in a left to right direction. If an acceleration "a" is applied to the frame 15, the inertia of the weight 24 causes a turning moment to be imparted to the driver 20, causing the driver 20 to move towards the position illustrated in FIG. 7. If this turning moment is greater than the moment which is imparted by the weight of the yoke 30 and pawl 12, then the driver will tilt and since the spigot 32 is constrained in this movement by the walls of the aperture 33, the yoke and pawl will move upwardly. Since the driver 20 can tilt in any lateral direction because of its gimbal mounting, this can operate equally no matter in what direction the acceleration "a" acts. It will be noted that all movements of the elements 18, 20 and 30 with respect to one another have minimal friction.

As shown in FIG. 7, once the tilting has taken place, there is a gravitational force moment arm M between A and G, and this imparts an additional turning moment to the driver 20 which is in the same direction as caused by inertia of weight 24. Thus once tilting of the driver 20 with respect to its frame commences, the turning moment rapidly increases and this results in a snap action of the driver and a consequential snap action of the yoke 30 and the pawl 12.

In this invention the retractor can be mounted in various attitudes by use of an appropriately asymmetrical driver.

The gimbal outer member 18 may also be provided with an asymmetrical weight to provide for additional installation slopes beyond the capability of the asymmetry of the weight 24 of the driver 20.

I claim:

1. An acceleration sensor which is useful for lifting a pawl into a locking position in engagement with a toothed wheel on a seat belt retractor comprising:
    a frame,
    a pawl carried by the frame and movable with respect to the frame between a wheel engaging position and a wheel disengaging position,
    a driver below the pawl, universal pivot means on the frame constraining the driver for tilting movement only with respect to the frame, the centre of gravity of said driver being above said universal pivot means so that said driver tends to topple about said pivot means,
    a lifting surface on said driver, which lies in a lifting plane until said driver tilts, surrounding the effective pivotal point of the universal pivot means and below the centre of gravity of the driver, said universal pivot means inhibiting rotation of said driver in said plane, and
    a yoke having a lower end engaging the lifting surface, and means retaining the upper end of the yoke in engagement with the pawl, so that tilting of said driver lifts said lifting surface which in turn lifts said yoke, such that said yoke lifts said pawl and moves said pawl into said wheel engaging position.

2. An acceleration sensor according to claim 1 wherein said driver comprises an asymmetrical weight.

3. An acceleration sensor according to claim 1 wherein said pivot means comprises a gimbal having an inner member and an outer member, said gimbal inner member comprising said driver and having pivot means pivoting said inner member to said outer member, and said outer member having pivot means pivoting said outer member to said frame.

4. An acceleration sensor according to claim 3 wherein each said pivot means comprises a respective pair of stub shafts having surfaces defining a pivotal edge.

5. An acceleration sensor according to claim 3 wherein said gimbal inner member comprises walls defining a peripheral annular trough, said pawl include an aperture, and said yoke comprises an inverted cup-like member having a peripheral lip at its lower end engaging said trough walls, and an upwardly projecting spigot freely movable in said aperture in said pawl.

6. An aceleration sensor according to claim 3 wherein said gimbal inner member comprises walls defining a peripheral annular trough, said pawl includes an aperture, and said yoke comprises an inverted cup-like member having a peripheral lip at its lower end engaging said trough walls, and an upwardly projecting spigot freely movable in said aperture in said pawl, the yoke peripheral lip comprising surfaces defining a pivotal edge.

7. An acceleration sensor according to claim 6 wherein said upstanding spigot has a shoulder with a part-conical surface which engages the edge defined between the pawl undersurface and the wall which defines the aperture containing said spigot.

8. A seat belt retractor acceleration sensor operable to lift a pawl, which is pivoted to a frame and has walls defining an aperture, into an engagement position of a toothed wheel of a seat belt retractor,
    comprising an annular yoke of inverted cup shape having an upstanding spigot which pivots freely in said aperture in the pawl, and also having a peripheral lip at its lower end,
    a gimbal having an outer member and an inner member which comprises a driver having walls defining an upwardly directed annular trough which walls are engaged by said peripheral lip of said yoke, first gimbal pivot means between said inner member of the gimbal and the outer member thereof and second gimbal pivot means, at right angles to said first gimbal pivot means between said outer member and frame, and a weight carried by said driver having a center of gravity above both said peripheral lip and said first and second pivot means,
    said engagement of said annular trough by said peripheral lip inhibiting toppling of said driver, but tilting of the driver due to acceleration or gravity causing consequential lifting of the yoke and movement of the pawl to said wheel engagement position.

9. An acceleration sensor according to claim 8 wherein said driver weight is asymmetrical with respect to a central axis normal to the peripheral lip of said yoke.

10. An acceleration sensor according to either claim 8 or claim 9 further comprising a plurality of circumferentially spaced projections outstanding radially from said driver, the annular trough walls being in said projections.

* * * * *